United States Patent [19]
Jannson et al.

[11] Patent Number: 5,365,354
[45] Date of Patent: Nov. 15, 1994

[54] GRIN TYPE DIFFUSER BASED ON VOLUME HOLOGRAPHIC MATERIAL

[75] Inventors: Tomasz P. Jannson, Torrance; David G. Pelka, Los Angeles; Tin M. Aye, Torrance, all of Calif.

[73] Assignee: Physical Optics Corporation, Torrance, Calif.

[21] Appl. No.: 848,703

[22] Filed: Mar. 9, 1992

Related U.S. Application Data

[63] Continuation of Ser. No. 591,801, Oct. 2, 1990, abandoned.

[51] Int. Cl.$^5$ .......................... G02B 5/32; G02B 5/02; G02B 27/48; G03H 1/32
[52] U.S. Cl. .......................................... 359/15; 359/22; 359/28; 359/599
[58] Field of Search ................. 359/15, 22, 24, 28, 359/599

[56] References Cited

U.S. PATENT DOCUMENTS

| | | | |
|---|---|---|---|
| 3,754,814 | 8/1973 | Leith | 359/599 |
| 4,035,068 | 7/1977 | Rawson | 359/599 |
| 4,602,843 | 7/1986 | Glaser-Inbari | . |
| 5,046,793 | 9/1991 | Hockley et al. | 359/599 |

Primary Examiner—Martin Lerner
Attorney, Agent, or Firm—Nilles & Nilles

[57] ABSTRACT

A diffuser based on a phase volume holographic medium is recorded non-holographically with speckle which define non-discontinuous and smoothly varying change in the refractive index of the medium. The diffuser scatters light traveling from an entrance surface to an exit surfaces and reflection from the diffuser is substantially limited to Fresnel reflection from the entrance and exit surfaces and light exiting the exit surface is substantially non-specular.

10 Claims, 7 Drawing Sheets

GRIN TYPE DIFFUSER BASED ON VOLUME HOLOGRAPHIC MATERIAL

This is a continuation of application Ser. No. 07/591,801, filed Oct. 2, 1990, now abandoned.

BACKGROUND OF THE INVENTION

1Field of the Invention

This invention pertains to the diffusion of light. More particularly, this invention relates to volume holographic scattering of light based on speckle theory.

2. Description of the Prior Art

Diffusers are used to scatter light so that an object in the path of the diffused light is illuminated from a number of directions. Typical state of the art diffusers are made from ground glass or photographic emulsion, and a typical diffuser might be the outside of a frosted light bulb or a ground glass plate or other rough surface placed near a light source. Ground or milk glass diffusers scatter light uniformly through large angles and have been used to average the effects of noise as discussed in M. J. Labatt and A. S. Marathay, Image Speckle Patterns of Weak Diffusers, J. Opt. Soc. of Amer. 65, 769 (1975).

It is well known that widen coherent light is incident on a surface which is optically rough, such as the above ground glass diffuser, a random intensity pattern is formed. This intensity pattern is typically called speckle. Speckle is present anywhere in space beyond a diffuser illuminated with coherent light as discussed in J. C. Dainty, Optica Acta, 17, 761 (1970). A number of authors including Dainty have studied the statistics of speckle created by an illuminated diffuse object. The pioneering analysis in this regard was made by L. I. Goldfischer, Autocorrelation Function and Power Spectral Density of Laser-Produced Speckle Patterns, J. Opt. Soc. of Amer., 55, 247 (1965). In his study, Goldfischer described the general structure of light scattered by diffusers as well as the characteristic speckle pattern. Goldfischer exposed photographic film directly to backscattered radiation from a diffuse surface illuminated by a coherent monochromatic source.

In S. Lowenthal and H. Arsenault, Image Formation for Coherent Diffuse Objects: Statistical Properties, J. Opt. Soc. of Amer., 60, 1478 (1970), a related concern, the determination of the statistics of the image given by an optical system with a coherent diffuse object was studied. While speckles are related to a random structure of a diffuser illuminated by coherent light, the spatial coherence of light is related to the random structure of the source radiation itself. W. H. Carter and E. Wolf, Coherence and Radiomerry with Quasi Homogeneous Planar sources, J. opt. Soc. of Amer., 67, 785 (1977) studied spatial coherence and quasi homogeneous sources generally. M. G. Miller, et al., Second-Order Statistics of Laser-Speckle Patterns, J. Opt. Soc. of Amer., 65, 779 (1975) discussed the statistics of laser speckle patterns in a plane some distance from a coherently illuminated object. M. Kowalczyk, Spectral and Imaging Properties of Uniform Diffusers, J. Opt. Soc. of Amer., 1, 192 (1984) sets out the theory relating to thin phase diffusers in coherent imaging systems.

A specific form of computer generated diffuser called a kinoform has also been studied. A kinoform is a computer generated wavefront reconstruction device which, like a hologram, provides the display of a two dimensional image. In contrast to a hologram, however, a kinoform yields a single diffraction order and reference beams and image separation calculations are unnecessary. A kinoform is purely phase because it is based on the assumption that only phase information in a scattered wavefront is required for time construction of the image of the scattering object. Kinoforms are discussed in L. B. Lesem et al., The Kinoform: A New Wavefront Reconstruction Device, IBM J. Res. Develop., March 1969 and H. J. Caulfield, Kinoform Diffusers (SPIE Proc. Vol 25, 111 (1971). Caulfield provides a general description of kinoform please diffusers and found that the angular spectrum of light scattered from a diffuser increases when the angular size of the aperture of time diffuser increases. Caulfield tested this by varying time distance between a diffuser mask comprising ground glass and a kinoform made of bleached silver halide. The textbook by J. W. Goodman, Statistical Optics, Wiley Interscience (1985) is a useful reference in studying the statistics of diffusers, speckles, and partial coherence of light as well as the spatial coherence of light, scattered by moving diffusers. Collier et al., Optical Holography, Academic Press (1971) is also helpful and like the other references cited is incorporated by reference herein.

The above diffusers, based on ground or milk glass, bleached silver halide plates, or surface type photoresist plates provide diffusion primarily only at their surface. This reduces the path length of the light affected by the diffuser thereby reducing the flexibility of the diffuser (the number of applications to which it may be put) and lowering losses due to reflection of the light in unwanted directions.

A diffuser which increases the optical path interaction length of the light in the diffuser would make it possible to design diffusers for many different types of applications that are currently not served well by state of the art diffusers and increase the efficiency of transmitted light through the diffuser. A diffuser which may be rotated would provide regulated spatial coherence useful in a number of applications.

SUMMARY OF THE INVENTION

A volume holographic diffuser which presents a large optical pathlength to light incident the diffuser and increases transmission efficiency is presented. Specifically, a volume holographic medium recorded with a speckle pattern yields a diffuser having gradually changing refractive indices perpendicular to the surface with respect to the rest of the volume. The diffuser provides light beam shaping capability by recording speckles of a certain shape in the diffuser which scatter collimated light into a controlled pattern with smooth brightness variation. The controlled diffusion achieves structure-less illumination patterns having uniform brightness with no lot spots or visual glare.

The diffuser achieves controlled directionality (angular distribution) of the diffused beam by insuring that the collimated light beam incident the diffuser is scattered into a wider set of directions, generally increasing the entropy or disorder of the light beam through volume scattering. Through volume scattering, the diffuser takes advantage of the cumulative effects of passage of the light through an extended gradually scattering medium. Instead of scattering the light using sharp edges or boundaries found in ground glass or photoresist surface diffusers as well as the silver grains of bleached silver halide, the volume holographic diffuser of the present invention scatters light from the smoothly varying changes in the refractive index of the diffuser where the speckles are recorded.

By controlling the way in which the speckles are recorded in the volume holographic diffuser, highly controlled diffusion of light is possible with relative ease and low cost compared to state of the art diffusers. Different patterns of spatially fluctuating refracting index can be recorded in the volume and tailored so that the resulting scattered beam can take a variety of angular shapes depending on the application. Consequently, the diffuser may be employed in a wide variety of lighting tasks in which controlled diffusion as well as color correction are needed.

DESCRIPTION OF THE PREFERRED EMBODIMENTS

Figure 1:
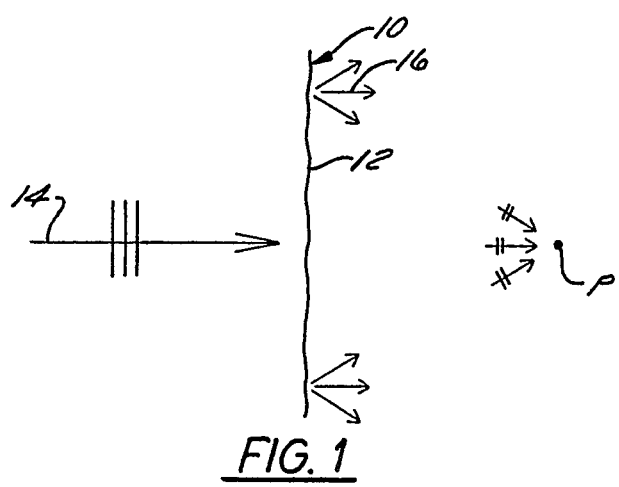
FIG. 1 is a schematic of a light beam incident on a light scattering structure having random surface variations.
Figure 2:
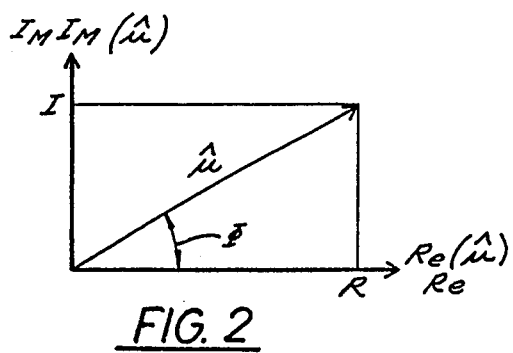
FIG. 2 is a schematic of phasor $\mu$ having imaginary and real components and an angle $\Phi$ with respect to the real axis.

Shown in FIG. 1 is a light scattering structure 10 having random surface variations 12 which scatter light from light beam 14 in numerous directions. Each light beam 16 scattered from the structure or diffuser 10 can be described by the equation $$\mu = |\mu|e^{i\Phi} = Re[\mu] + Im[\mu] = R + iI \qquad \text{(Eq. 1)}$$

where i equals the square root of $-1$. This phasor representation of the scattered light takes into account the amplitude and phase of the scattered beam 16 for the coherent light case. Only when coherent light is incident the structure 10 does the phase component need to be considered because all waves will interfere if the light is coherent. A typical source of coherent light is a laser. In Eq. 1 $|\mu|$ is the module which indicates amplitude, and $e^{i\Phi}$ represents phase. The phasor $\mu$ can be represented graphically by the schematic in FIG. 2 where the phasor is $|\mu|$ long and has imaginary and real components at an angle $\Phi$ with respect to the real or horizontal axis R.

Figure 3:
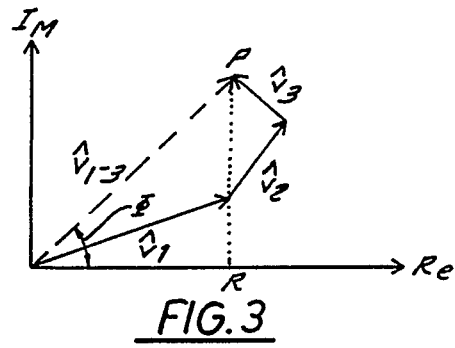
FIG. 3 is a depiction of the summation of three phasors $v_1$, $v_2$, $v_3$ having different amplitudes and phase.

Light diffracted from the structure of diffuser 10 creates a speckle pattern. Speckle can be seen in a room as spatial variations of intensity of the light from point to point. Some points will be at high intensity or bright, and others will be at low intensity or dark. Referring again to FIG. 1, specifically point P, the light incident point P is made up of light scattered from many directions each beam of which can be represented by a phasor. To calculate the intensity of the light incident point P, the phasors of all the scattered light beams at that point can be added. It is not possible to predict what the intensity will be at any particular point such as point P in a scattered light field. The results can be widely varying depending upon how the phasors happen to add up at that point. FIG. 3 shows how three phasors $v_1$, $v_2$, and $v_3$ add up to comprise the light at point P. The result is a phasor $v_{1-3}$ having an angle $\Phi$ with respect to the real axis and amplitude R. Again, if noncoherent light is used only the amplitudes need be considered because noncoherent light has an undetermined phase between 0 to $2\pi$.

In another case, if the vectors $v_1$ and $v_2$ were pointing in substantially different directions unlike in FIG. 3, then when summed, the vectors would result in a composite vector $v_c$ having a much smaller amplitude than that summation vector $v_{1-3}$ in FIG. 3. Thus, both time amplitude and the phase of each of the component vectors at point P will determine the intensity of the light at point P. The results generally call be described by what is called the random walk. The random nature of the speckles is due to the random diffuser structure 10.

Figure 4:
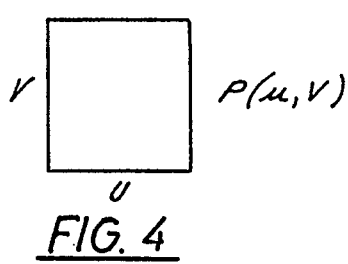
FIG. 4 is a schematic of a mask diffuser aperture described by the relation $P(u,v)$.

Although it is not possible to predict position, intensity, or size of the speckles generated by random structures exposed to coherent light, it is possible to determine the average size of the speckles (rms) using statistical averaging methods. The size of the speckles is related to the geometry of the mask diffuser aperture creating the speckles including its total area. Inherently, one analyzing this phenomenon would come to the conclusion that for a given size of diffuser having dimension $P(u,v)$ with vertical height v and horizontal width u as shown in FIG. 4, time speckles generated by the diffuser will be larger if the angular size of the aperture is smaller. That is, where the total area of the diffuser is small the angular size of the aperture is small and the speckles will be large. Conversely, in an aperture of large area, it would be impossible for the huge number of phasors generated by that aperture to constructively interfere thereby reducing the average size of the speckles produced by that diffuser.

After deriving the size of the speckles, the size of the angular spectrum of the scattered light, i.e., the size of the beam scattered from the diffuser, can be determined from the size of the speckles. Inherently, it can be anticipated that the size of the angular spectrum of the scattered light, in other words the angular distribution of the scattered light, depends on the average size and shape of the speckles. If the speckles are small, the angular distribution will be broad. If the speckle size is horizontally elliptical, the shape of the angular distribution will be vertically elliptical.

There are, broadly, two steps needed to create a speckle pattern. The first is to record speckles and the second is to scatter light incident on them. Speckles are recorded in the preferred embodiment of this invention by employing a mask diffuser having an aperture of known angular size upon which is incident coherent light. Light scattered from the mask diffuser aperture is then recorded on a recording medium such as a volume hologram which records the size axed shape of each of the speckles created by the mask diffuser aperture. Then, the speckle pattern is reconstructed by exposing the recorded speckles in the volume hologram to light (coherent or incoherent) which then creates a speckle pattern of desired size and shape.

Figure 5:
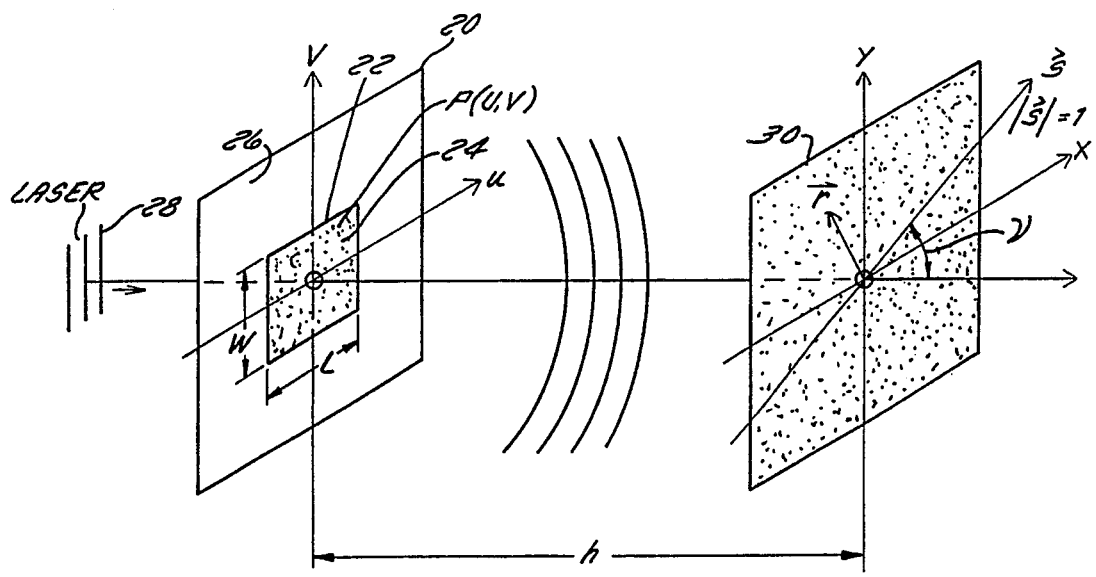
FIG. 5 is a schematic of a recording setup used to produce volume diffusers in accordance with the present invention.

The recording set up is shown in FIG. 5. A mask diffuser 20 having aperture 22 having speckles 24 in the form of ground glass for example, and backed out area 26 has overall dimensions of W height and L width and aperture dimensions of $P(u,v)$. The function $P(u,v)$ describes the size and shape of the aperture. The mask diffuser 20 is exposed to a source of coherent light 28 such as a laser. The light is scattered by the aperture 22 of mask diffuser 20 and propagates toward a recording medium 30 situated h distance away. The light beam propagating toward the recording medium 30 can be characterized by numerous phasors discussed above having varying amplitudes and directions. In random fashion, the light is recorded on the recording medium 30 which may in a preferred embodiment be dichromated gelatin (DCG) or photopolymer. The position of any one speckle recorded in the recording medium 30 is described by its x and y components and direction of scattered light by the unit vector $\bar{s}=(s_x,s_y)$.

The reconstruction process, i.e., the illumination of the recorded holographic medium 30 is first discussed for purposes of analytical ease after which the recording process is discussed.

The following equation $J(s)$ describes how the intensity of light which is scattered by the diffuser 30 depends on a number of factors.

$$J(\bar{s}) = \cos \nu I_o A \int \int dxdy \, e^{-iks\cdot r} \cdot W(\bar{r}) \qquad \text{(Eq. 1)}$$

where $\bar{r}=(x,y)$, A is a constant, and $\bar{s}=(s_x, s_y, s_z)$ where $s_x^2+s_y^2+s_z^2=1$, and $W(r)$ is an autocorrelation function described by the equation $$W(\bar{r}) = <t(\bar{r}'+\bar{r})t^*(\bar{r}')> = W(x,y) = <t(x'+x, y'+y) t^*(x', y')> \qquad \text{(eq. 2)}$$

which is the autocorrelation function of the holographic diffuser 30 transmittance and where the symbol $<\ldots>$ is the ensemble average and r is a 2D vector in x,y space and shows how the two functions the shifted and unshifted functions, correlate or overlap. Because the size of the speckles is small the area of overlap between two speckles is also small. In linear approximation the diffuser transmittance is proportional to the light intensity during recording of diffuser 30 and is described by the equation $$t = BI \qquad \text{(Eq. 3)}$$

assuming linear photographic recording where t is proportional to intensity, B is a proportionality constant and I is the intensity modulation. Intensity modulation by definition ignores any bias level intensity in the system. Thus, $W(\bar{r})$ can be described by the following equation where I is intensity, $\bar{r}'$ is unshifted r and $\bar{r}$ is shifted r.

$$W(\bar{r}) \alpha <I(\bar{r}'+\bar{r}) I(\bar{r}')> \qquad \text{(Eq. 4)}$$

Note that although s is determined in the x, y, and z directions, the z direction need not be specified for the autocorrelation function because s is a unit vector, that is, $|\bar{s}|=1$. Also note that the transmittance function t indicates that the function is shifted right or left by the amount r' as in $t(r'+r)$. Eq. 4 depends only on the degree to which intensity modulates or varies above or below some bias level.

According to Goldfischer in L. Goldfischer, JOSA. 55, 247 (1965) the intensity autocorrelation function is given by $$<I(\bar{r}'+\bar{r}) I(\bar{r}')> = C|F(\bar{r})|^2 \qquad \text{(Eq.5)}$$

where c is a constant and $$F(\bar{r}) = F(x,y) = \int \int dudv \, P(u,v) \, e^{-i2\pi(xu+yv)/\lambda h} \qquad \text{(Eq. 6)}$$

where again $P(u,v)$ is the aperture function of the mask diffuser aperture 22. Substituting Eq. 5 into Eq. 1 we obtain $$J(\bar{s}) = \cos \nu \cdot D \int \int dxdy |F(x,y)|^2 e^{-iks\cdot r} \qquad \text{(Eq. 7)}$$

Substituting Eq. 6 into Eq. 7, we obtain $$J(S_x,S_y) = \cos \nu \cdot D \int \int dudv \, P(u,v) \times P(u+s_x\cdot h, v+s_y\cdot h) \qquad \text{(Eq. 8)}$$

as can be seen in Goldfischer. It should be noted that all uniform constant intensity factors are ignored for clarity.

The ensemble average ($<...>$) is often used in random or stochastic processes where the overall picture or image is of interest. Many small characteristics or effects within the overall image are averaged to achieve the ensemble average. The book M. Born and E. Wolf, Principals of Optics, Pergamon Press (1980) provides a general discussion of stochastic processes and is incorporated by reference herein.

It can be seen that t is the ratio of the amplitude of the intensity behind the diffuser 30 to the intensity in front of the diffuser 30 and is a function of the recording process, in particular, the intensity of the light on the front side of the diffuser 30 (the side toward the mask diffuser aperture) during exposure. By definition then the autocorrelation function W(r) is proportional to the modulation of the light intensity (I) in space.

The process of recording the diffuser 30 using mask diffuser 20 is described by Eqs. 5 and 6. The F in Eq. 5 is defined in Eq. 6 and is the Fourier transformation of the mask diffuser aperture 22 and depends on the coordinate (x,y) of the plane of the diffuser 30, i.e., F is a 2D Fourier transform of P(u,v) and where P as discussed above, is the aperture function P(u,v)={1/0. P(u,v) =1 (inside aperture), and 0 (otherwise).

Eq. 8 describes the relationship between the mask diffuser 20 exposed to coherent light radiation and the ultimate diffused speckled beam generated by the diffuser 30. Thus importantly, Eq. 8 permits a determination of the characteristics of the final speckle pattern directly from the characteristics of the mask diffuser 20 and the light to which to it is exposed without regard to the intermediate diffuser 30. Eq. 8 states that the angular distribution of light behind the diffuser 30 is an autocorrelation of the aperture function P of the mask diffuser used for recording. In other words, the diffuser 30 is recorded using the aperture of the mask diffuser 20. When the diffuser 30 is afterwards illuminated or reconstructed it is found that the angular distribution of the light scattered from the diffuser 30 is based on the autocorrelation function of the mask diffuser aperture 22, i.e., the shape of the mask diffuser aperture. This important relationship can be used as a tool to create a controllable angular spectrum of light from the diffuser 30. This phenomenon is not possible without speckle and provides the basis for illustrating the importance and unexpected advantages of the volume holographic diffuser of time present invention.

An example of the creation of a diffuser from a rectangular mask diffuser aperture is now provided.

Figure 6:
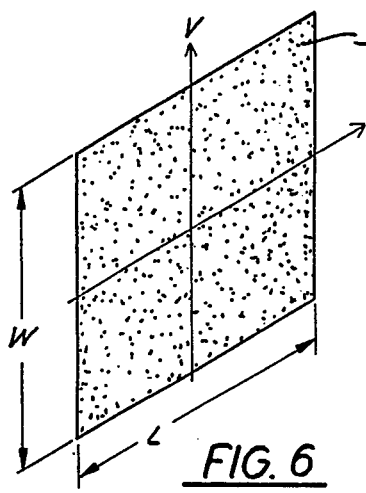
FIG. 6 is a schematic of a mask diffuser aperture having height W and width L.

Referring to FIG. 6, a mask diffuser aperture 34 having height W and width L made of, for example, ground glass is depicted. The aperture can be described by the equation $$P(u, v) = rect\frac{u}{L} \cdot rect\frac{v}{W}, \text{ where } rect\frac{u}{L} = \begin{cases} 1 \text{ for } |u| \leq \frac{L}{2} \\ 0 \text{ for } |u| > \frac{L}{2} \end{cases}$$ (Eq. 8.5)

Figure 7:
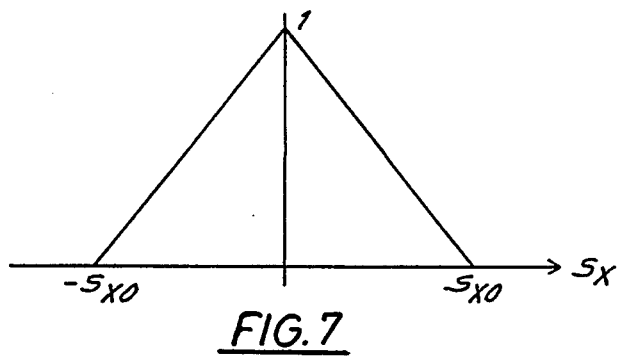
FIG. 7 is a schematic of the autocorrelation function of two rectus functions.

Using Eq. 8 the following is derived $$J(s_x, s_y) = \cos\nu \cdot D \cdot \Lambda\left(\frac{s_x}{s_{xo}}\right)\Lambda\left(\frac{s_y}{s_{yo}}\right)$$ (Eq. 9)

where $\Lambda$ is the triangular autocorrelation function in the form shown in FIG. 7 having amplitude 1 and $s_x$ intersections at points $-s_{xo}$ and $s_{xo}$. The triangle is the result of the autocorrelation or overlap of two rectangles. The function shows that intensity is a maximum where the rectangles (the rectus functions) are totally superimposed and the function is a minimum (zero) where the two rectangles separate completely say at $-s_{xo}$. According to Eq. 8.5

$$s_{xo}L/h$$ (Eq. 10a)

for the horizontal direction and $$s_{yo}W/h$$ (Eq. 10b)

for the vertical direction.

Figure 8:
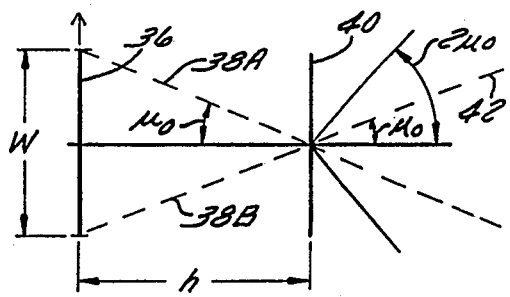
FIG. 8 is a schematic of external light rays scattered from a mask diffuser aperture onto a diffuser of the present invention.

It can be seen that the width of the base of the triangle is twice the width of the rectangle in either the horizontal or vertical directions (L or W) respectively. This is illustrated in FIG. 8 which shows an aperture 36 having width W and converging extremal rays 38A arid 38B upon the center of a diffuser 40 at angle $\mu_0$. The light scattered from the diffuser 40 (on the right hand side of diffuser 40) is scattered at an angle twice $\mu_o$. The dashed line 42 shows light scattered at an angle equal to $\mu_o$ which is an angle equal to the light incident upon diffuser 40 from the aperture 36, But, as illustrated by the autocorrelation function studied above, the autocorrelation function is twice as large as the rectus function and thus the angular spectrum of the light scattered from the diffuser 40 is twice as large as the angular spectrum of the aperture 36. In summary, the angle $\mu_o$ is determined by the angular size of the mask diffuser aperture observed from the center point of the recording medium, and the size of the angular spectrum of the diffuser is twice the size of the angular spectrum of the mask diffuser aperture observed from the center point. Furthermore, the shape of the resulting intensity spectrum is triangular whereas the shape of the original aperture was rectangular.

Eq. 6 above shows the important conclusion that the size of the speckles in the diffuser is not determined by the size of the speckles in the mask diffuser aperture but only by the angular size of the mask diffuser aperture which in turn determines time intensity of the light passing through the mask diffuser aperture and incident upon the diffuser. Furthermore, in turn, the size of the speckles recorded in the diffuser determines the intensity angular distribution of the scattered beam from the diffuser. The intensity of the scattered beam from the diffuser is not determined, as shown in Eq. 6, by the intensity of the beam incident the mask diffuser aperture.

This recording technique allows the manipulation of the angular spectrum of scattered light by changing the shape and size of the original aperture thus providing a means to produce diffusers for myriad applications. For instance, if the original aperture has a circular shape the light scattered from the diffuser has a circular shape. If the aperture is rectangular, and the light incident the mask diffuser aperture is of uniform intensity distribution, the shape of the light scattered from the diffuser is rectangular and has a triangular intensity distribution as discussed above.

Figure 9:
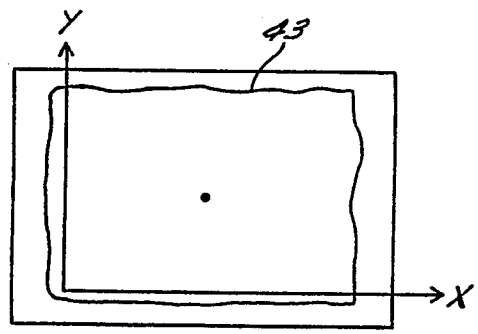
FIG. 9 depicts an example of the shape of a light beam scattered from a diffuser.

Referring to FIG. 9, the shape 43 of a light beam scattered from a recorded diffuser is shown as rectangular. The angular intensity distribution of the light within the rectangular shape however is triangular and is strongest at the center of the rectangle and diminishes outwardly toward the edges of the rectangle. The fact that the intensity angular distribution is always triangular, due to the autocorrelation function, is one limitation of this method. This would substantially prevent recording step functions.

The size of the speckles recorded in the diffuser is now determined from the size of the mask diffuser aperture. This is an important determination because the size and shape of the speckles recorded in the diffuser determine the intensity of the light scattered from the diffuser. If Eq. 6 is rewritten in the form $$F(x,y) = \int\int du\, dv\, P(u,v)\, e^{i2\pi(f_x \cdot u + f_y \cdot v)} \quad \text{(Eq. 11)}$$

where $$f_x = \frac{x}{\lambda h} \text{ and } f_y = \frac{y}{\lambda h}$$

and for a rectus aperture function $P(u,v) = \text{rect}\, u/L \cdot \text{rect}\, u/W$, the following is derived:

$$F(x,y) = \text{sinc}(f_x \cdot L)\, \text{sinc}(f_y \cdot W) \quad \text{(Eq. 12)}$$

where $$\text{sinc}(\zeta) = \frac{\sin \pi \zeta}{\pi \zeta}.$$

Figure 10:
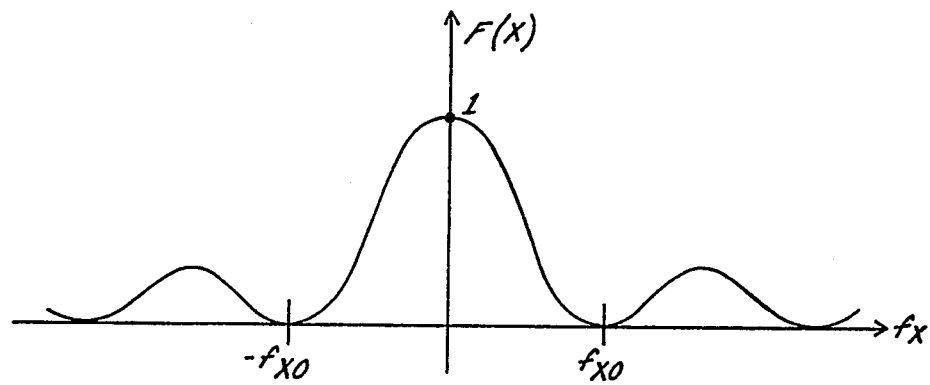
FIG. 10 is a schematic of the sinc function which describes the shape of a speckle recorded in a volume diffuser of the present invention.

Eq. 12 is a sinc function which is illustrated in FIG. 10 and describes the shape of time speckles recorded in time diffuser. Referring to FIG. 10, the first zero of time sinc function is at $-f_{xo}$ and $f_{xo}$. The following equations apply:

$$f_{xo} \cdot L = 1 \rightarrow f_{xo} = \frac{1}{L} = \frac{x_o}{\lambda h} \rightarrow x_o = \frac{\lambda h}{L}.$$

Figure 11:
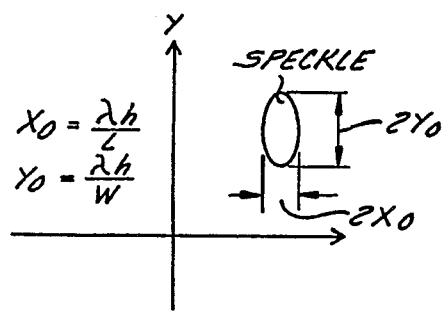
FIG. 11 is a schematic of the shape and size of a speckle recorded in a volume diffuser of the present invention.

Defining the size of aim average speckle as time distance between the first two zeros of time sinc function, $-f_{xo}$, $f_{xo}$, the average speckle size is therefore $(2x_o, 2y_o)$ as illustrated in FIG. 11 where $$x_o = \frac{\lambda h}{L} \quad \text{(Eq. 13a)}$$

and $$y_o = \frac{\lambda h}{W}. \quad \text{(Eq. 13b)}$$

Figure 12:
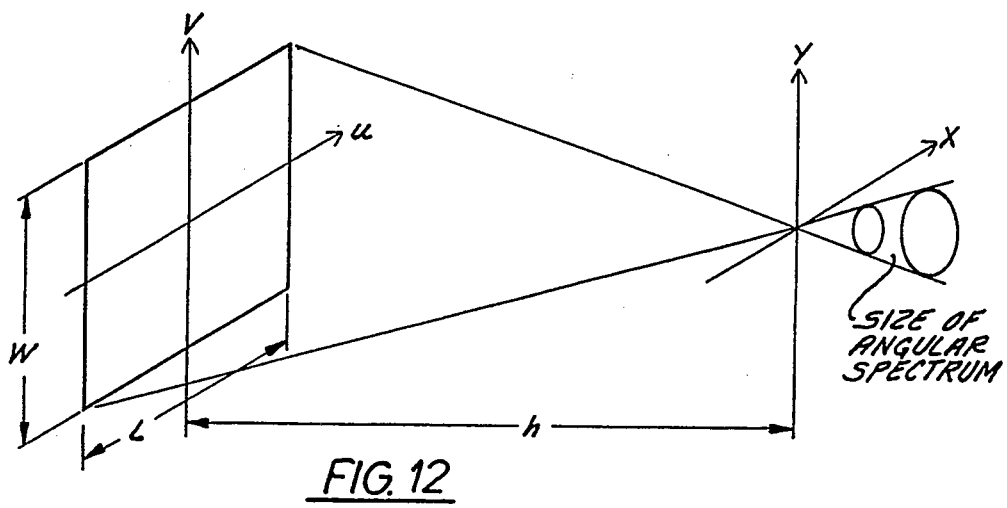
FIG. 12 shows the relative size of a mask diffuser aperture and the angular distribution of light scattered from a volume diffuser.

This shows that speckle size is inversely proportional to the aperture size L and W, respectively. Referring to FIG. 12 (also see FIG. 8), if the size of time aperture increases, the size of the speckles decreases and time size of the angular spectrum of time scattered light increases. Conversely, if the size of the mask diffuser aperture decreases, the size of the speckles recorded in the diffuser increases and the size of the angular spectrum of light scattered from the diffuser decreases. Thus, if the mask diffuser aperture is long and narrow, the speckles will be long and narrow as well with their axes oriented perpendicular to the axis of the aperture. This holds true for both the volume holographic diffusers of the present invention and surface holographic diffusers.

Denoting the speckle sizes by $$\partial x = 2x_o \text{ and } \partial y = 2y_o \quad \text{(Eq. 14)}$$

and comparing Eqs. 10 and 14 we obtain $$2X_o \cdot s_{xo} = 2\lambda,\ 2y_o \cdot s_{yo} = 2\lambda \quad \text{(Eq. 15)}$$

On the basis of Eq. 10 we have the following simple interpretation shown in FIG. 12 where, if $s_{xo} = 0.1\ (5°)$ we have $$2x_o = \frac{2\lambda}{s_{xo}} = 20\lambda = 10\mu,$$

for $\lambda = 0.5\mu$, and $L/h = 0.1$.

Here we define the following scattering centers $A_x$, $A_y$ and the optical path length, $L_s$, in the following form $$A_x = 2x_o = \epsilon_x \lambda \quad \text{(Eq. 16)}$$

where $$\epsilon_x = \frac{2h}{L}$$

and $$A_y = 2y_o = \epsilon_y \lambda \quad \text{(Eq. 17)}$$

Figure 13:
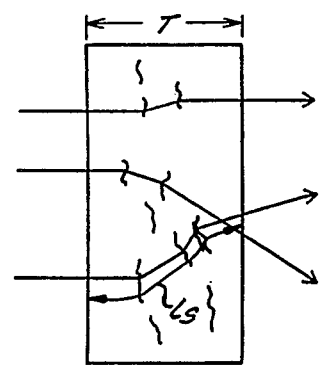
FIG. 13 is a schematic of a volume diffuser of the present invention having thickness t and interaction length $L_s$.

Now considering a diffuser made from a volume holographic material such as DCG in a preferred embodiment, the thickness of the material is defined as T as shown in FIG. 13 and the interaction length, $L_s$, is the total optical path length of a light beam through the material and is greater than T, i.e., $L_s > T$. Defining $$T = \mu \lambda \quad \text{(Eq. 18)}$$

we obtain $$L_s >> A_x = \epsilon_x \lambda \quad \text{(Eq. 19)}$$

since, $$T/A_x = \mu/\epsilon_x \quad \text{(Eq. 20)}$$

we arrive at a typical $\mu$ of 80 for $T = 40\mu$ and $\lambda = 0.5\mu$. Because $\epsilon_x \approx 10 T/A_x \approx 5-10$ and since $L_s > T$ $L_s$ is about 10–100 of $A_x$. This means that light passing through the volume holographic material interacts with many scattering centers $A_x$ throughout the volume thus increasing the optical path length of any light beam through the material many times.

This phenomenon in the volume holographic material begins to look like a GRIN (graded refractive index) medium according to GRIN optics theory which is well known in integrated optics texts such as D. Marcus, Light Transmission Optics, Academic Press (1980). A volume holographic medium recorded with speckle is thus strongly nonhomogeneous, such as a GRIN lens, because $L_s$ is much greater than $A_x$. Thus, the volume holographic medium of the present invention can be defined as a purely phase highly nonhomogeneous GRIN medium.

Purely phase GRIN media have two basic properties: 1) almost all incident light is scattered, i.e., specular light is very weak, and 2) only a small fraction of incident light is reflected, i.e., diffraction efficiency is close to 100% (excluding Fresnel loss). Thus, almost all light entering a volume holographic diffuser of the present invention is passed through and not absorbed because the material is purely phase. Furthermore, almost all light that passes through the volume holographic diffuser is scattered so that no undiffracted beams of light emerge from the diffuser. These characteristics are all due to the volume nature of the material.

Figure 14:
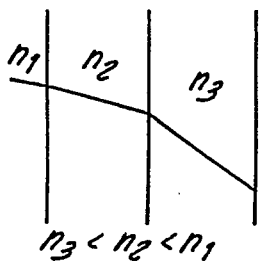
FIG. 14 is a schematic of a light beam diffracted within a medium having a number of different refractive indices.

As is characteristic of GRIN type media which have multiple layers of materials having different refractive indices (i.e. graded refractive indices), as the number of different refractive indices in the material is increased any ray that is incident the material follows a curved line through the material rather than a path having abrupt changes in direction. This is due to the fact that light attempts to spend more time in "faster" portions of the media as illustrated in FIG. 14. It can be seen in FIG. 14 that the path length of the light wave in medium $n_1$ which has the highest index of refraction is short compared to the path length of the light wave in medium $n_3$ which has the lowest refractive index corresponding to the fastest medium. This phenomenon is described by the well-known Fermat principle.

The volume holographic diffuser of the present invention acts like an optimized GRIN lens where there are no sharp boundaries between regions in time material having different refractive indices and there are potentially virtually innumerable numbers of different refractive indices present in the same volume due to the recording of speckles in the volume. We now show that the volume holographic diffuser of the present invention is purely phase in character and thus does not absorb or reflect incident light and scatters all light that passes through it.

Referring again to Eqs. 13 and 16-19 for the average speckle size, $$A_{xo} = \frac{2\lambda h}{L} = \epsilon_x \lambda$$

where $$\epsilon_x = \frac{2h}{L}$$

and is usually between 1-5), for $\lambda = 0.5\mu$ and knowing that the total optical path length $L_s > T = \mu\lambda$ which can be rewritten $$\frac{L_s}{A_x} > \frac{\mu\lambda}{\epsilon_x\lambda} = \frac{\mu}{\epsilon_x}$$

it can be derived that $$\frac{L_s}{A_x} = \frac{40 - 100}{\epsilon_x}$$

which is $\approx 10$. Thus $L_s/A_x \approx 10$ which means that all light going through the volume is substantially scattered. Additionally, no light is reflected from the volume because it is known that in GRIN media there is no reflection because there are no edges or sharp boundaries from which light can reflect.

The need to eliminate such boundaries within the material is apparent and can be accomplished through smooth processing of variations in the refractive index in a volume holographic diffuser of the present invention. This is possible because the speckle recorded in the diffuser is not determined by grains in the material as it is in silver halide type diffusers or by surface roughness, but are unexpectedly created by the boundaries between changes in the refractive index in the material. In this sense, the speckles recorded in the volume holographic diffuser are "true" speckles. A preferred method of processing is now described.

Volume holographic material such as DCG is used in fabrication of high efficiency volume diffusers. The volume diffuser can be either holographic or kinoform. In either case, the volume nature of the diffuser and its associated processability are essential for production of high efficiency diffusers (nearly 100% if Fresnel loss, 8%, is neglected).

Figure 15:
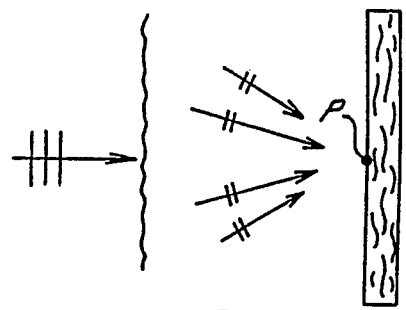
FIG. 15 is a schematic of light beams diffracted from a mask diffuser aperture incident upon point P on a volume diffuser of the present invention.
Figure 16:
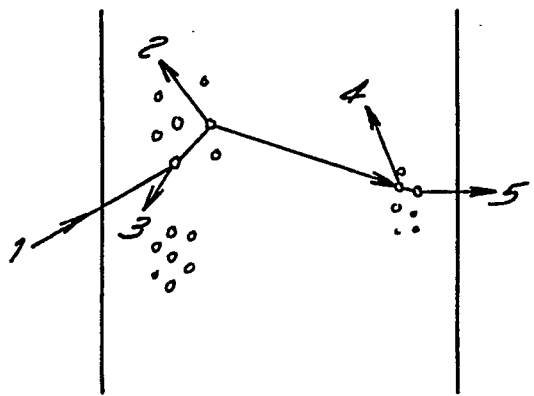
FIG. 16 is an illustration of light scattered and reflected within a state of the art diffuser material such as bleached silver halide.
Figure 17:
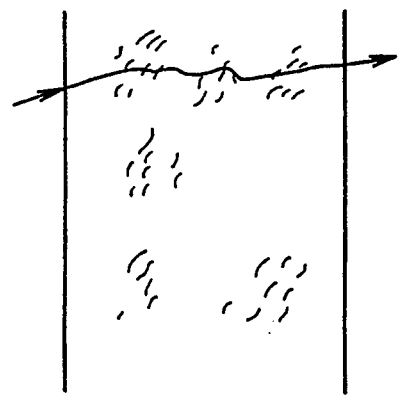
FIG. 17 is an illustration of the smooth diffraction of a light beam within a volume diffuser of the present invention recorded with speckle.
Figure 26:
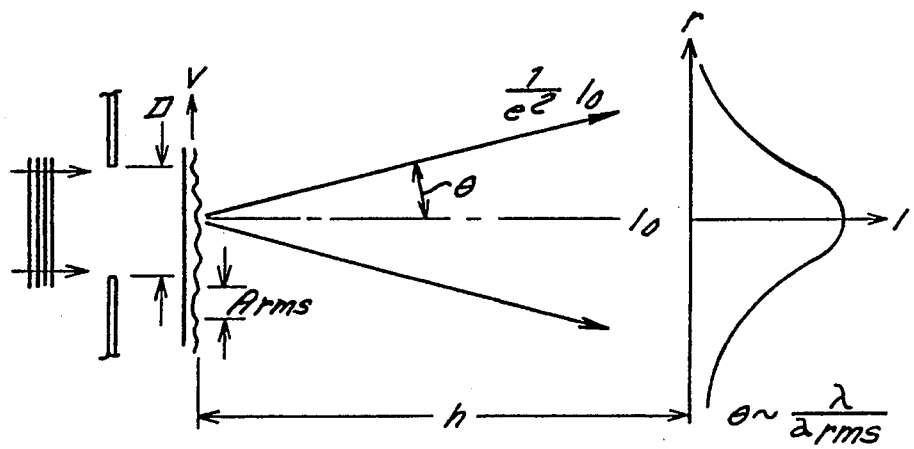
FIG. 26 is a schematic of a rotating diffuser arrangement.

Referring to FIG. 15, during recording of such diffusers, a point P on the recording material receives an infinite number of elementary plane waves composing the incident diffused laser beam at wavelength $\lambda$ (e.g., $\lambda = 514$ nm from an Argon laser). In order to record the amplitude and phase information of the incident beam at point P, the resolution limit of the material must necessarily be very high. Silver halide when bleached properly can provide such resolution, but its resolution is limited by the size of the silver grain. In volume phase material like DCG, however, there is no limit on the resolution (because of the molecular sizes of its refractive index changes). The silver halide case is shown in FIG. 16 where incident light beam 1 is reflected at grain boundaries and lost as shown by beams 2, 3, and 4, and beam 5 is the transmitted (modulated) beam. The DCG case is shown in FIG. 17 where, because the index change is based on molecular sizes, the material presents gradual refraction index boundaries. Therefore no reflection losses occur inside the material.

According to the above models of silver halide and DCG, it is clear that the losses in grain type material will be proportional to the number of photo active grains, which increases with the information contempt of the incident beam. Therefore, scattered light will increase with an increase in efficiency and information content of the recording laser beams. It seems that this is the reason why there are limits in maximum efficiency and signal to noise ratios achievable with silver halide materials as shown by Solymar & Cooke, Univ. of Oxford, U.K. Holography Group.

In the approach of the present invention, volume phase material like DCG is used where there are theoretically no such limits on efficiency and S/N ratio. The material has very high efficiency. 99.99% efficient holographic mirror DCG holograms are achievable with ease which suggests an index modulation as high as 0.15. This shows very high dynamic range and resolution. Also, DCG when properly processed, is as clear as glass. These important properties of DCG volume phase material as well as DCG/polymer graft/composite and highly-efficient photopolymers are important for practical development and production of high efficiency diffusers.

Processability of the recording material is also essential for production of efficient diffusers. Most recording materials have limited spectral sensitivity. DCG, for example, is photosensitive only to $\lambda$ in the vicinity of 500 nm. When recording with a fixed laser (e.g., $\lambda = 514$ ns or 488 nm from an Argon Ion laser), the hologram normally has a rather narrow spectral (i.e., wavelength) response, which is suitable for applications like three color 3D projection screens. However, when white light is used in applications, such as in automobile leadlights, the diffuser must have a broadband response. Therefore the recording material must be processable for different applications. Volume phase materials like DCG possess this essential property.

For a particular application, several parameters are preferably optimized. For a particular type of gelatin: thickness of the film is 5–100 microns; hardness of the film is achieved by 5 hours to a few weeks hardening time plus prebaking; dichromate concentration is varied to create nonuniform hardness which may provide large bandwidth; exposure energy is 50–1000 mJ/cm$^2$; recording wavelengths are 457, 488, and 514 nm, as well as others, in the vicinity of this region.

Preferred processing parameters and steps necessary to achieve required bandwidth and peak wavelength and efficiency of the diffuser of the present invention include: 1) fixing time of 3 sec-1 min in fixer solution for optimum hardness; 2) swelling time of 3–10 minutes in water at an optimum temperature of 25°–30° C. Longer swelling gives wider bandwidth and longer peak wavelength; 3) processing times in water/alcohol baths of 25°–30° C. for 1–2 minutes each bath. Faster processing time gives wider bandwidth and vice versa; 4) baking in vacuum oven at 80°–100° C. for 5 minutes to 1 hour. Baking in vacuum reduces the bandwidth but is necessary to obtain a stable hologram for a longer time; and 5) sealing the hologram with a cover glass using optical epoxy.

For a particular application like a headlight diffuser where wide band response is required, a thin emulsion with higher dichromate concentration is preferable. A moderately hard film (about 24 hours old—aged or hardened by the so called "dark reaction" technique) and exposure energy of 400 mJ/cm$^2$ with 514 nm recording wavelength can usually provide time necessary parameters.

For a holographic diffuser (i.e., recorded with a separate reference beam in addition to the recording beam as described below) a thicker film with moderately high concentration will provide broader bandwidth and higher efficiency.

For multiplied holographic diffusers, as described below, such as three color, 3D projection screens (such as in U.S. Pat. No. 3,479,111), where higher angular resolution is necessary, a thick DCG film is preferable.

Figure 18A:
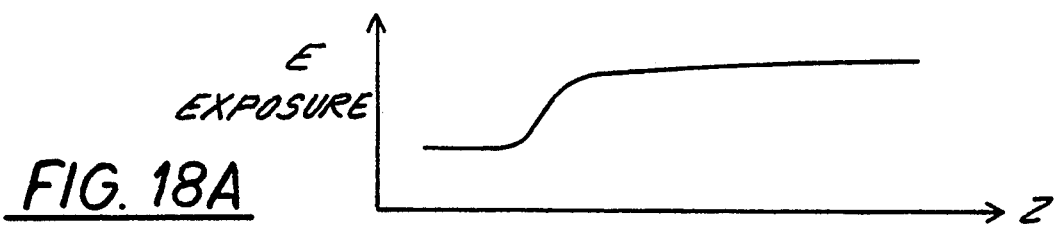
FIGS. 18A-D show the evolution of the modulation of the refractive index, n, in a volume diffuser of the present invention during processing and recording.
Figure 18B:
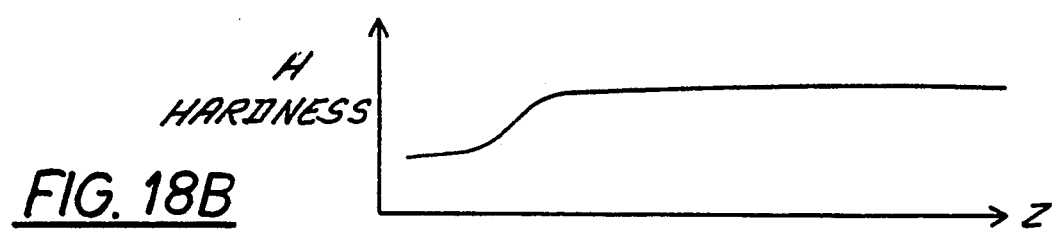
Figure 18C:
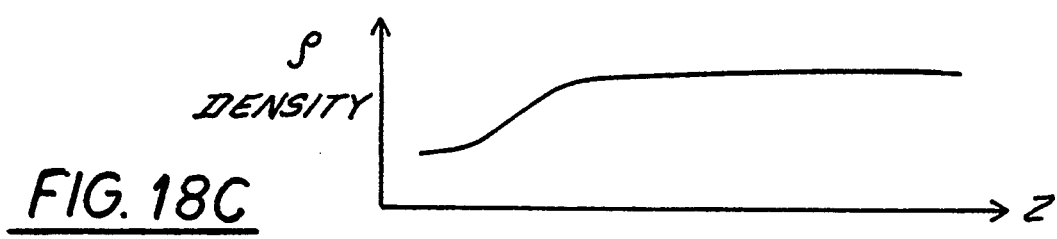
Figure 18D:
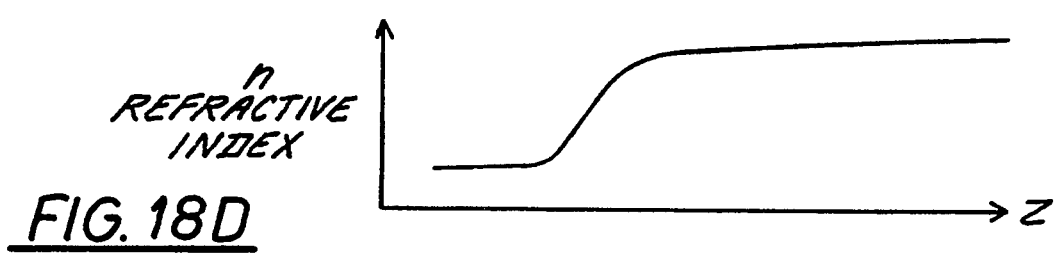

The recording process of the volume holographic material permits the recording of smooth boundaries between areas having different refractive indices. FIG. 18A-D shows the evolution of the modulation of the refractive index in a volume holographic material during processing and recording. FIG. 18A shows the level of exposure energy, E, across the material in time z axis, FIG. 18B shows the hardness, H, at the molecular level of the polymer chains of the material, FIG. 18C shows the density $\rho$ of the material and how the density varies gradually across time material, and FIG. 18D shows time final modulation of the refractive index, n, in the material. Note that all of these effects are at the molecular level and so are inherently very smooth with respect to light diffracted by the material.

Figure 19:
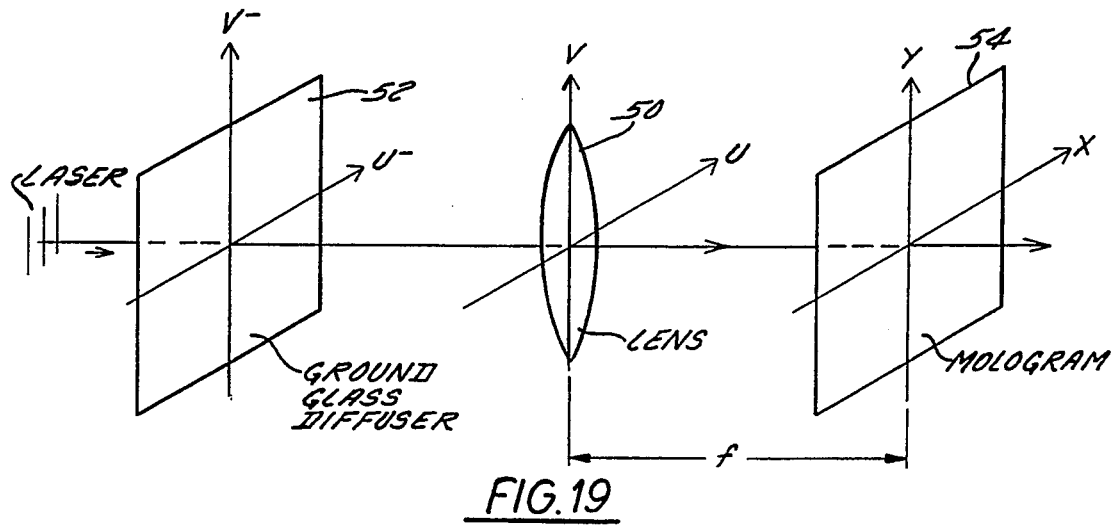
FIG. 19 is a schematic of an alternative recording arrangement utilizing a lens in accordance with the present invention.

Another embodiment of the invention involves recording the volume holographic diffuser with a lens. Referring now to figure 19, a lens 50 is positioned between a ground glass diffuser 52 and the holographic volume 54. The lens 50 is used during recording of the diffuser 54 to assist in efficiency of the recording process particularly with respect to maintaining optical intensity of time recording laser beam. The lens 50 is situated at a distance from the diffuser 54 equal to the focal length f of the lens. With respect to the above analyses, the distance h would be replaced with the distance f in the above equations. In this case, P(u,v) in Eq. 8 is represented by the lens aperture, and h is replaced by f. Then, instead of equations 13 and 14, we have $$\partial x = 2x_0 = \frac{2\lambda f}{L} \qquad \text{(Eq. 21)}$$

and $$\partial y = 2y_0 = \frac{2\lambda f}{W} \qquad \text{(Eq. 22)}$$

in accordance with Collier, et al., Optical Holography, 347, Academic Press (1971) incorporated herein by reference.

In the above discussions, it was shown that the diffuser was recorded using a single beam of coherent light and reconstructed using a monochromatic plane wave (either coherent or noncoherent). Multibeam recording and non-monochromatic beam reconstructing are preferable in certain applications. The non-monochromatic beam constructing method is low discussed. Referring now to $$\mu_o(r) = \mu_o e^{(iks_o \cdot r)} \qquad \text{(Eq. 23),}$$

Eq. 23 governs a monochromatic plane wave reconstruction beam (as in the original case) and is slightly generalized to include non-normal angles of incidence, i.e., $s_o \neq 0$. The ensemble average of Eq. 23 is $$<\mu(r'+r)\mu(r')> \qquad \text{(Eq. 24)}$$

as a consequence, instead of Eq. 2, we obtain $$W(\bar{r}) \, e^{(iks_o \cdot r)} \qquad \text{(Eq. 25)}$$

where $$W(\bar{r}) = <t(\bar{r}'+\bar{r}) \, t(\bar{r}')>.$$

Now, assuming a slowly varying function $\cos \nu$, J(s) in Eq. 1 can be replaced by the generalized formula $$J(\bar{s}, \bar{s}_o) = \cos \nu \, I_o(\bar{s}_o) \int \int dxdy \, e^{-ik(\bar{s}-\bar{s}_o)\cdot r} W(\bar{r}) \qquad \text{(Eq. 26)}$$

and thus, with accuracy to slowly-varying terms, $$J(\bar{s}, \bar{s}_o) = J(\bar{s} - \bar{s}_o)$$

From Eq. 26 it can be seen that J depends on $\bar{s} - \bar{s}_o$. This is called angular invariancy.

Now, if the reconstruction wave is made a non-plane wave (but still monochromatic) and after numeralizing $J(s, s_o)$ we obtain the following general formula for time monochromatic, arbitrary illumination case $$J(\bar{s}) = \int \int h(\bar{s}-\bar{s}_o) I_o(\bar{s}_o) \, ds_{xo} ds_{yo} \qquad \text{(Eq. 28)}$$

where $$h(\bar{s}-\bar{s}_o) = \cos \nu \int \int dxdy \, e^{-ik(\bar{s}-\bar{s}_o)\cdot r} W(\bar{r}) \qquad \text{(Eq. 29)}$$

is the impulse response of the system. Eq. 28 is a generalization of Eq. 26 and describes the broadening of the angular spectrum scattered by the diffuser due to non-plane illumination. The angular spectrum of incident illumination is described by $I_o(\bar{s}_o)$.

Eq. 28 is for the monochromatic case, thus for the non-monochromatic case $J(\bar{s})$ should be replaced by $$J(s) \rightarrow J(s,\lambda) \qquad \text{(Eq. 30)}$$

as well as $$I_o(s_o) \rightarrow I_o(s_o,\lambda) \qquad \text{(Eq. 31)}$$

and Eq. 28 should be replaced by $$J(\bar{s}) = \int \int \int h(\bar{s}-\bar{s}_o,\lambda) I_o(\bar{s}_o,\lambda) \, ds_x ds_x d\lambda \qquad \text{(Eq. 32)}$$

Thus, the equations have been generalized to take into account non-plane wave reconstruction beams and polychromatic reconstruction beams. The additional polychromatic broadening is obtained by the only wavelength dependent factor $$e^{-ik(s-s_o)\cdot r} = e^{-i\frac{2\pi}{\lambda}(s-s_o)\cdot r} \qquad \text{(Eq. 33)}$$

Figure 20:
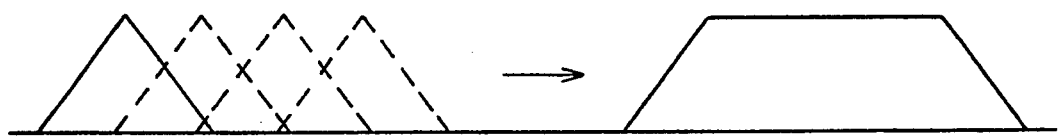
FIG. 20 is a schematic of a shifted autocorrelation function due to a change in the angle of incidence of light incident a volume diffuser of the present invention.

Eq. 33 shows that $J(\bar{s})$ depends only on $(\bar{s}-\bar{s}_o)$ angular invariance. This shows that if the angle of incidence of light on the diffuser is changed, the shape of the scattered beam from the diffuser does not change, only its direction. Thus, if the original response of the diffuser was the triangular autocorrelation function, then even in the polychromatic non-plane wave reconstruction case the intensity response remains a triangular autocorrelation function but shifted for each different angle of incidence as shown in FIG. 20 for the monochromatic case. In order to estimate the degree of broadening, the x dependent phase term of Eq. 33 is considered in the form $$\Phi = \frac{2\pi}{\lambda} s_x \cdot x \qquad \text{(Eq. 34)}$$

Now, comparing the effects of wavelength shift (polychromatic case) and angular shift, the phase term in Eq. 33 is differentiated with respect to $s_x$ and $\lambda$. Now, assuming $\Delta\Phi=0$ the equivalent angular shift is derived in the form $$\Delta\Phi = 0 \rightarrow \Delta \frac{s_x}{\lambda} = 0 \qquad \text{(Eq. 35)}$$

and thus $$\frac{\Delta\lambda}{\lambda} = \frac{\Delta s_x}{s_x}. \qquad \text{(Eq. 36)}$$

Then assuming $s_x = \sin\nu$ we have $ds_x = \cos\nu d\nu$ and instead of Eq. 36 the following is derived.

$$\frac{\Delta s_x}{s_x} = \frac{\Delta\nu}{\tan\nu} \qquad \text{(Eq. 37)}$$

and specifically for $\tan\nu \approx 1$ we roughly have, using Eq. 36, $$\frac{\Delta\lambda}{\lambda} = \Delta\nu. \qquad \text{(Eq. 38)}$$

In general according to Eq. 35 the angular spectrum (i.e., $\Delta s_x > 0$) is broadened for longer wavelengths. This broadening can be estimated using Eq. 38. For $\lambda\Delta=20$ nm in Eq. 38, $\Delta\nu$ (angular change) is 2°. This means that the effects of wavelength shift in the polychromatic reconstruction beam case are much smaller than the effects of angular shift in the non-plane wave case involving varying the angle of incidence of the reconstructing beam on the diffuser.

Figure 21:
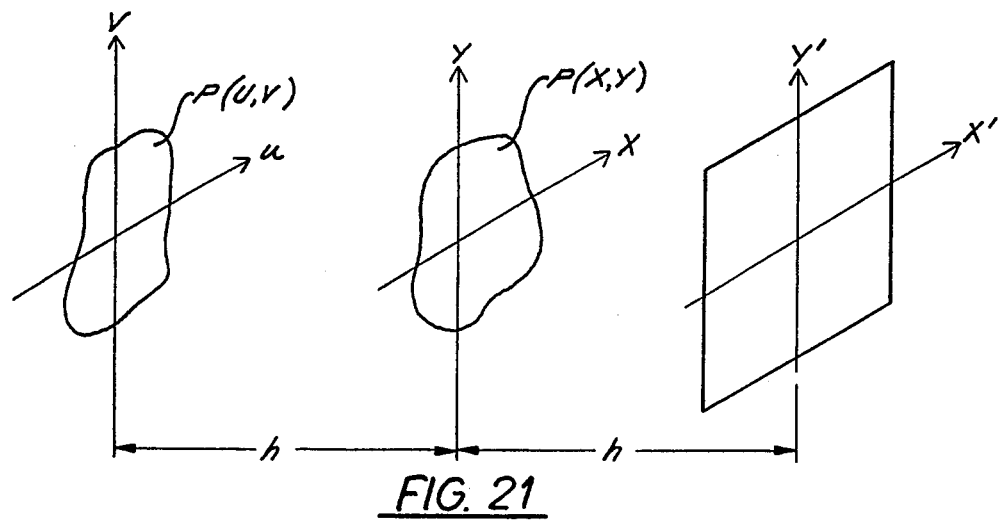
FIG. 21 is a schematic of a dual aperture recording of a volume diffuser of the present invention.

Another embodiment of the volume holographic diffuser of the present invention involves recording the diffuser using double mask diffuser apertures as shown in FIG. 21. In accordance with Eq. 8 above, the equation defining this situation is $P(u,v) = P_1(u,v) + P_2(u,v)$ and, instead of a single autocorrelation response, three responses are obtained: a cross correlation of $P_1$ with $P_2$ ($P_1*P_2$), and the cross correlations of $P_2$ with $P_1$ ($P_2*P_1$) and the autocorrelation pattern combining the correlations of $P_1$ with itself ($P_1*P_1$) and $P_2$ with itself ($P_2*P_2$). Writing Eq. 8 in abbreviated form we get (accurate for slowly-varying factors)

$$J=(P*P) \qquad \text{(Eq. 39)}$$

where * is the correlation symbol. Expanding Eq. 39 the following is obtained $$J=P_1*P_1+P_2*P_2+P_1*P_2+P_2*P_1 \qquad \text{(Eq. 40)}$$

Figure 22:
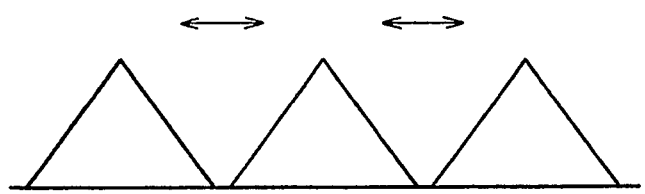
FIG. 22 is a schematic of a triple autocorrelation function from a volume diffuser of the present invention illuminated with polychromatic non-plane light.

The first portion of Eq. 40 is the autocorrelation term and the second portion is the cross correlation term. The multiple correlation functions are illustrated in FIG. 22.

Figure 23:
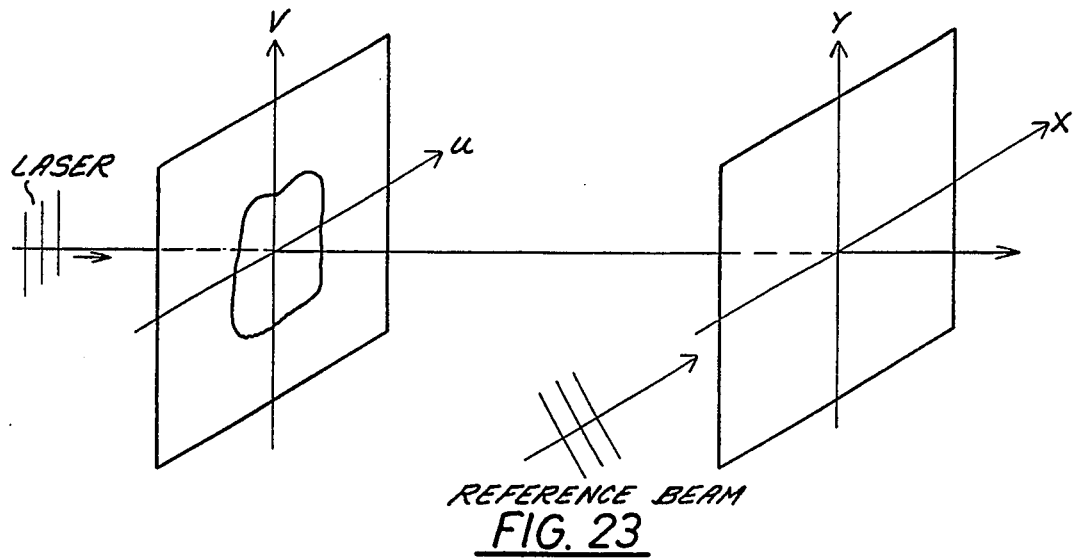
FIG. 23 is a schematic of a recording arrangement of a volume diffuser of the present invention wherein a reference beam is used.

In another embodiment of the present invention, the volume holographic diffuser can be recorded with an additional reference beam as shown in FIG. 23. In this case, since the hologram is of the volume type, we obtain the Bragg reconstruction of the diffuser pattern with Bragg angular and wavelength selectivity when the diffuser is illuminated. The ability to control Bragg angular and wavelength selectivity further increases the flexibility of the diffuser. The Bragg conditions are described in Collier, et al., Optical holography, mentioned above.

Angular selectivity allows use of multiplexed diffusers. For instance, if the original recording beam is designated D1 and the second recording beam (reference beam) is designated R1, two different sets of speckles will be recorded in the diffuser. In another case, if two different mask diffuser apertures are used to record the diffuser using beams D1 and D2, then two different reconstructing beams $R_{c1}$ & $R_{c2}$ may be used to reconstruct their respective diffuser structures recorded by $D_1$ and $D_2$. Since the volume holographic diffusers have Bragg selectivities, the reconstructing beam $R_{c1}$ will reconstruct only diffuser beam $D_1$. The beam $R_{c2}$ will reconstruct only diffuser beam $D_2$. Thus, Bragg selectivity can be used to implement a stereoscopic viewing system where the image from the first reconstruction beam is directed to one eye and the image from the second reconstruction beam is directed to the other eye. This type of system may be used to implement a 3D viewing system of the type generally disclosed in D. Gabor, U.S. Pat. No. 3,479,111.

FIGS. 24 A–E show various arrangements for recording volume holographic diffusers of the present invention. FIG. 24A shows the recording of a holographic diffuser using only one beam D which emanates from a mask diffuser aperture. FIG. 24B shows holographic (dual beam recording) where a volume diffuser is recorded using the original beam D and an additional reference beam R. FIG. 24C shows the reversal of the position of the reference beams D and R from the arrangement illustrated in FIG. 24B. FIG. 24D shows recording a volume diffuser using two different masks D1 and D2 and consequently two different recording beams (but no reference beam). FIG. 24E shows two recording beams $D_1$ and $D_2$ and two reference beams $R_1$ and $R_2$. In reconstruction $R_1$ references only D1 and R2 references only D2 due to Bragg selectivity. The number of recording and reconstruction beams and their positioning can be varied virtually infinitely.

Figure 25A:
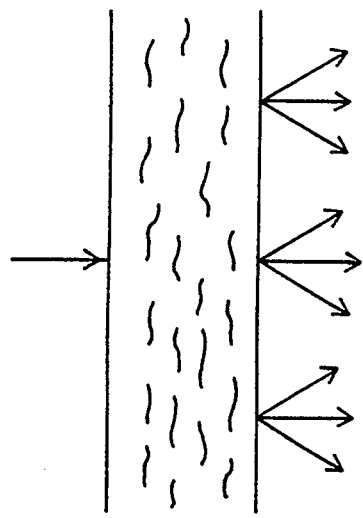
FIGS. 25A and 25B respectively show a transmission volume diffuser and a reflection volume diffuser of the present invention.
Figure 25B:
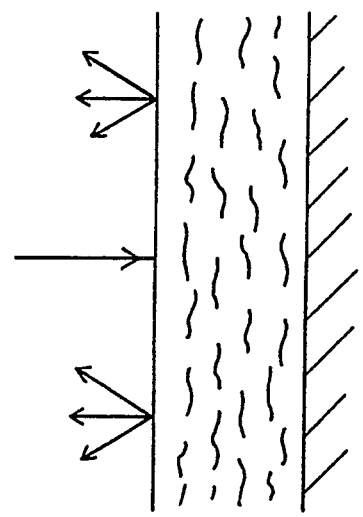
Figure 24A:
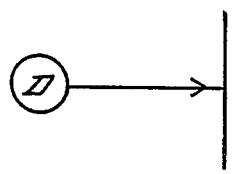
FIGS. 24A-E are schematics showing various recording beam and reference beam arrangements.
Figure 24B:
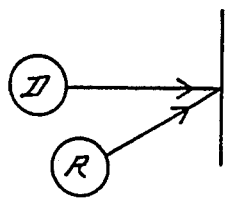
Figure 24C:
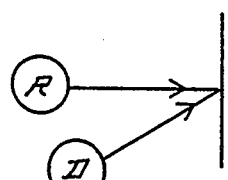
Figure 24D:
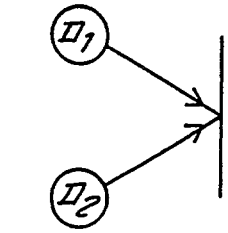
Figure 24E:
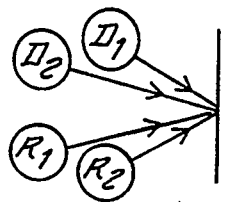

In yet another embodiment of the present invention, the volume holographic diffuser may be of either the transmission or reflection type as shown in FIGS. 25A and 25B. In FIG. 25A the light beam incident the diffuser from the left hand side is scattered in many directions from the right hand side of the diffuser in the same direction, generally, as the incident beam. In FIG. 25B, a reflection type grating reverses the direction of the scattered phasors with respect to the incident beam. This is accomplished by metalizing (or creating a mirror at) one side of the diffuser, in this case the right hand side. The incident beam travels through the medium and is diffracted by numerous changes in the refractive index of the material, reflected from the metalized back surface of the diffuser, further diffracted by numerous changes in the refractive index of the material, and emerges in a direction generally antiparallel to the incident beam on the same side of the diffuser as the incident beam.

There are numerous and important applications for the volume holographic diffusers of the present invention. Holographic light transformers (HLTs) are useful in a variety of applications where light must be shaped in one or two dimensions. Examples are indoor task lighting and uniform and nonuniform illumination of indoor and outdoor signs. Headlights of automobiles typically must have nonuniform light distribution to prevent blinding oncoming drivers and yet insure adequate illumination of upcoming terrain. A diffuser of the present invention may be used in the headlamp assembly to achieve the appropriately shaped beam. Indoor and outdoor commercial and industrial lighting requires appropriate ambience and directional characteristics of the light. One diffuser may be used to achieve both of these. Holographic light transformers using the diffuser of the present invention may turn one beam into many beams or project light in an off axis way. Not only can a programmed far field radiation pattern be achieved with the diffusers of the present invention, but an output color which is optimized for the application and not completely dependent on the output spectrum of the source may be achieved by tuning the hologram to the appropriate wavelengths or using absorption dyes.

Conventional diffusers such as ordinary frosted glass may be replaced with the diffusers of the present invention. Ordinary frosted glass diffusers are only capable of scattering light into a hemispherical pattern and rely on surface roughness, a micro scale irregularity which is difficult to control, to achieve the diffusion. Designers thus have little ability to specify a particular scattering pattern. The diffuser of the present invention, on the other hand, may be recorded with variations in the index of refraction in the volume hologram that achieve a variety of beam shapes and give the source a glare-free appearance. Examples include a holographic diffuser on a round flash light that can produce an elliptical illumination pattern. This would normally require an elliptical reflector on a state of the art flashlight. The diffuser of the present invention can achieve the elliptical illumination pattern using existing reflectors. Furthermore, the diffusers of the present invention can in addition to scattering light into a hemispherical pattern, spread light into a moderate angle usually between 20°–80°, and at extremely low cost.

In another extremely important application of the volume holographic diffusers of the present invention, the diffuser is used as part of a flat panel display such as in high definition television (HDTV). Employing a vertically oriented mask diffuser aperture, a speckle pattern in the diffuser is recorded that when reconstructed provides a horizontally elliptical angular spectrum. The diffuser, when integrated into the front of a flat panel display, increases peripheral viewing and resolution greatly. Examples of HDTV displays are discussed in L. Tannas, Jr., HDTV Displays in Japan: Projection—CRT Systems on Top, IEEE Spectrum (Oct. 1989). The diffusers of the present invention may be used to accurately conserve energy at the viewing surface of the screen and keep it confined to the solid angle subtended by the audience, otherwise known as screen gain. Screen gain is defined as the ratio of luminous output from a viewing surface compared to a Lambertian distribution. The diffusers of the present invention can achieve control of screen gain at low cost. Current screens employ surface texture to achieve desired screen gain at higher cost and less efficiency than a volume holographic diffuser.

An example of the design of a preferred projection screen begins with Eqs. 13 A and B $$A_x = \frac{2\lambda h}{L}, A_y = \frac{2\lambda h}{W}$$

where $A_x$ and $A_y$ define the average statistical sizes of the speckles (scattering centers) in the x and y directions respectively. Since in a projection screen it is desirable to have a wider field of view and resolution in the horizontal direction, $A_y$ should be larger than $A_x$ and thus W should be less than L. For instance, if h/L=5/2 then $A_x$ is $\approx 5\lambda$ which is a few microns, a microscopic pattern not visible to the eye.

As noted above, although any holographic speckle pattern used to control scattering light has an intensity that is maximum in the center and decreases outwardly, and whose scattered beam is less well defined than the shape of the original aperture, these negative effects can be minimized by changing the angle of incidence on the diffuser by superimposing many plane waves of different indicent angles on the diffuser to achieve an autocorrelation function that is more step function like in character as discussed above and shown in FIG. 20.

Diffusers may also be rotated or moved to obtain source width regulated spatial coherence. This effect is not limited to the volume holographic diffusers of the present invention but may be employed, unexpectedly, with any type of diffuser. In these cases, the rotation of the diffuser must be sufficiently fast to satisfy the ergodic hypothesis described in M. Born and E. Wolf, Principles of Optics, Pergamon Press (1970). The fundamental requirement of a rotating diffuser is that a large number of speckles should pass the point of observation during any given response time of the detector.

The detector response time, t, and other dynamic parameters of the diffuser such as linear velocity, $v$, and the number of speckles, N, passing the pinhole, during the detector response time are related by the following equation $$t = \frac{NA_{rms}}{v}. \quad \text{(Eq. 41)}$$

In order to obtain the Ergodic pressures we assume that the number N should be $$N > 10 \quad \text{(Eq. 42)}.$$

Using the elementary relation between linear velocity and frequency of rotation and Eqs. 41 and 42 we obtain $$N = t \cdot r \cdot \frac{2\pi f}{A_{rms}} > 10 \quad \text{(Eq. 43)}$$

and we obtain the following relation for maximum detector frequency response $$v = \frac{1}{t} < \frac{f \cdot r}{A_{rms}}. \quad \text{(Eq. 44)}$$

For example, for a cycling frequency of 100 Hz, radius of rotation r=1 meter and $A_{rms}$=1 mm we obtain $v$=100 kHz.

In the case of the rotating diffuser, the radius of spatial coherence $\rho_{coh}$ is equal to the speckle's rms (average speckle size) which equals $A_{rms}$, i.e., $$\rho_{coh} = A_{rms} \quad \text{(Eq. 45)}$$

This formula allows the production of sources having regulated degrees of spatial coherence. The degree of regulation can be varied by modifying the aperture function P(u,v). The following shows that in spite of spatial coherence changes the temporal coherence of the diffuser is only slightly degraded.

According to Goodman, Statistical Optics, 195, the mutual coherence function of light scattered by a moving diffuser, with velocity $v$ and rms=a, is $$\phi(y_1,y_2,\tau) = e^{-a(\Delta y)^2} e^{-a(v\tau)^2} e^{2av\tau\Delta y} e^{-j2\pi\gamma\tau} \quad \text{(Eq. 46)}$$

where $\Delta y = Y_2 - Y_1$, and $\tau$ is time delay. According to the Wiener-Khinchin theorem, $$G(\gamma) = \int \phi(\tau) \exp(-j2\pi\gamma\tau) dt \quad \text{(Eq. 47)}$$

and the uncertainty relation, $$\Delta\tau\Delta\gamma \sim 1 \quad \text{(Eq. 48)}$$

it is seen that the temporal part of Eq. 46 has the form $$\phi(\tau) \alpha e^{-\left(\frac{\tau-\tau}{\Delta\tau}\right)^2} \quad \text{(Eq. 49)}$$

where $$\Delta\tau = \frac{1}{\sqrt{av}} \quad \text{(Eq. 50)}$$

while the spatial part of Eq. 46 is defined by $$\phi(\Delta y) \alpha \exp[-a(\Delta y)^2] \quad \text{(Eq. 51)}.$$

Therefore, the approximate radius of spatial coherence $\rho_{coh}$ is $$\rho_{coh} = \frac{1}{\sqrt{a}}. \quad \text{(Eq. 52)}$$

Comparing Eq. 52 and 50 we obtain $$\Delta\tau = \frac{\rho}{v} \text{coh}. \quad \text{(Eq. 53)}$$

Thus, according to Eq. 48

$$\Delta\gamma = \frac{1}{\Delta\tau} = \frac{v}{\rho_{coh}} \quad \text{(Eq. 54)}$$

and thus $$\frac{\Delta\gamma}{\gamma} = \frac{v}{\rho_{coh}} \cdot \frac{\lambda}{c} = \frac{v}{c} \cdot \frac{\lambda}{\rho_{coh}} \quad \text{(Eq. 55)}$$

and since $\rho_{coh} > \lambda$ we finally obtain $$\frac{\Delta\gamma}{\gamma} < \frac{v}{c}. \quad \text{(Eq. 56)}$$

Therefore for $v \ll c$, we obtain $$\frac{\Delta\gamma}{\gamma} \ll 1. \quad \text{(Eq. 57)}$$

For example, for f=100 Hz, r=1 m, $v = 2\pi f \cdot r \approx 600$ m/sec, while c=3·10⁸ meters per second, $$\frac{\Delta\gamma}{\gamma} < \frac{6 \cdot 10^2}{3 \cdot 10^8} = 2 \cdot 10^{-6} = \frac{\Delta\lambda}{\lambda}.$$

For
$\lambda = 1 \ \mu m = 10^4$ angstroms, $\Delta\lambda = 0.02$ angstroms, $$l_{coh} = \frac{\lambda^2}{\Delta\lambda} = \lambda \cdot \frac{\lambda}{\Delta\lambda} = 1\mu \cdot \frac{1}{2 \cdot 10^{-6}} = 10^6 \cdot .5\mu = 50 \text{ cm} \quad \text{(Eq. 58)}$$

A volume holographic or other type of diffuser rotated sufficiently fast to satisfy the Ergodic equations can be used where secrecy of communication is desirable. Because only the spatial coherence of the signal is modulated, conventional detectors cannot detect any signal (unless a coherence detector is used). This type of moving diffuser may be used with a coherence filter as disclosed in U.S. Pat. No. 4,958,892 Diffraction Coherence Filter.

It is to be understood that embodiments of the present invention not disclosed herein are fully intended to be within the scope of the claims.

We claim:

1. A diffuser having an entrance surface and an exit surface for light, and a center, the diffuser comprising a phase volume holographic medium having a refractive index and recorded non-holographically using a single source of coherent light and a mask diffuser aperture having an angular size, and with random, disordered and non-planar speckle means, and processed so that the speckle means 1) define non-discontinuous and smoothly varying changes in the refractive index of the medium, 2) provide scatter, with non-discontinuous reflection, of light traveling from the entrance surface to the exit surface, and 3) have a statistical average size which is inversely proportional to the angular size of the aperture viewed from the center of the diffuser, whereby 1) reflection from the diffuser is substantially limited to Fresnel reflection from the entrance and exit surfaces and 2) light exiting surface is substantially non-specular; wherein the diffuser has no phase information stored therein.

2. The diffuser as defined in claim 1 recorded with speckle from a plurality of mask diffuser apertures.

3. The diffuser of claim 1 used to control the illumination pattern of a vehicle headlamp.

4. The diffuser of claim 1 used to shape the illumination pattern of a light source.

5. A diffuser having an entrance surface and an exit surface for light, and a center, the diffuser comprising a phase volume holographic medium having a refractive index and recorded non-holographically using a single source of coherent light and a mask diffuser aperture having an angular size, and with random, disordered and non-planar speckle means, and processed so that the speckle means 1) define non-discontinuous and smoothly varying changes in the refractive index of the medium, 2) provide scatter, with non-discontinuous reflection, of light traveling from the entrance surface to the exit surface, and 3) have a statistical average size which is inversely proportional to the angular size of the aperture viewed from the center of the diffuser, whereby 1) reflection from the diffuser is substantially limited to Fresnel reflection from the entrance and exit surfaces and 2) light exiting the exit surface is substantially non-specular, and wherein said speckle means has first speckle and second speckle, said diffuser recorded with first speckle from a first mask diffuser aperture and first beam, and second speckle from a second mask diffuser aperture and second beam, where the first speckle reconstructs with the first beam and the second speckle reconstructs with the second beam.

6. An apparatus comprising:
a flat panel television display including a diffuser having an entrance surface and an exit surface for light, and a center, the diffuser controlling the viewing angle of the display and including a volume holographic medium having a refractive index and recorded non-holographically using a mask diffuser aperture having an angular size L/h and W/h with random, disordered, and non-planar speckle means, the medium being processed so that the speckle means 1) are anisotropically vertically oriented, 2) define non-discontinuous and smoothly varying changes in the refractive index of the material, and 3) provide scatter, with non-discontinuous reflection, of light traveling from the entrance surface to the exit surface and have a statistical average size equal to $(2X_o, 2Y_o)$ where $$X_o = \frac{\lambda h}{L}$$

and $$y_o = \frac{\lambda h}{W}$$

where L is the aperture length, W is the aperture width, h is the distance between the aperture and the diffuser, and $\lambda$ is the wavelength of the light, and whereby (1) reflection from the diffuser is substantially limited to Fresnel reflection from the entrance and exit surfaces and (2) light exiting the exit surface is substantially non-specular; wherein the diffuser has no phase information stored therein.

7. A reflection diffuser for light and having a center, the diffuser comprising a volume holographic medium having a refractive index and two opposing sides;
one side of the medium comprising a mirror so that light entering the other side of the medium is diffracted by the medium, is reflected from the mirror and is further diffracted by the medium before exiting the other side;
the medium being recorded non-holographically with speckle means using a mask diffuser aperture having an angular size, and processed so that the speckle means 1) define non-discontinuous and smoothly varying changes in the refractive index of the medium, 2) provide scatter, with non-discontinuous reflection, of light traveling from the entrance surface to the exit surface, and 3) have a statistical average size which is inversely proportional to the angular size of the aperture viewed from the center of the diffuser, whereby (1) reflection from the diffuser is substantially limited to Fresnel reflection of light entering the other side, and to light reflected from the mirror, and (2) light exiting the other side is substantially non-specular; wherein the diffuser has no phase information stored therein.

8. A communication device for modulating a signal-carrying laser beam including a rotating diffuser which modulates the spatial coherence of the beam comprising a volume holographic material having recorded therein speckle defining smoothly varying changes in the refractive index of the material, the diffuser rotating at a speed sufficient to satisfy the ergodic condition:

$$N = t \cdot r \cdot \frac{2\pi f}{A_{rms}} > 10$$

where t is the detector response time, r is the radius of rotation, f is the cycling frequency, N is the number of speckles passing a specific location during time t, and $A_{rms}$ is average speckle size.

9. A device for controlling the degree of spatial coherence of a light source comprising a volume holographic diffuser recorded with speckle defining smoothly varying changes in the refractive index of the diffuser and rotated at a speed sufficient to satisfy the ergodic condition:

$$N = t \cdot r \cdot \frac{2\pi f}{A_{rms}} > 10$$

where t is the detector response time, r is the radius of rotation, f is the cycling frequency, N is the number of speckles, and $A_{rms}$ is average speckle size.

10. A method of making a diffuser, comprising:
 (A) providing a recording medium having a refractive index, a center, and first and second surfaces;
 (B) providing a single source of coherent light;
 (C) providing a mask diffuser aperture between said recording medium and said source of coherent light, said mask diffuser aperture having an angular size; and
 (D) non-holographically recording random, disordered, and non-planar speckles on said recording medium by 1) impinging light, generated by said light source and scattered by said mask diffuser, on said first surface of said recording medium such that the recording medium has no phase information stored therein, and then 2) processing said recording medium,
 said recording step being controlled so that the speckles 1) define non-discontinuous and smoothly varying changes in the refractive index of the recording medium, 2) provide scatter, with non-discontinuous reflection, of light traveling from the first surface to the second surface, and 3) have a statistical average size which is inversely proportional to the angular size of the aperture viewed from the center of the diffuser, and
 whereby, in use as a diffuser, 1) reflection from the recording medium is substantially limited to Fresnel reflection from the entrance and exit surfaces and 2) light exiting the exit surface is substantially non-specular.

* * * * *

UNITED STATES PATENT AND TRADEMARK OFFICE
CERTIFICATE OF CORRECTION

PATENT NO.  : 5,365,354
DATED       : Nov. 15, 1994
INVENTOR(S) : Jannson et al.

It is certified that error appears in the above-indentified patent and that said Letters Patent is hereby corrected as shown below:

In the ABSTRACT, line 4, delete "change" and substitute therefore
--changes--; and
line 6, delete "surfaces" and substitute therefore --surface--.
Column 1, line 26, delete "widen" and substitute therefore --when--.
Column 2, line 11, delete "please" and substitute therefore --phase--;
line 14, delete "time" and substitute therefore --the--;
line 15, delete "time" and substitute therefore --the--; and
line 55, delete "lot" and substitute therefore --hot--.
Column 4, line 28, delete "(Eq. 1)" and substitute therefore --(Eq. .1)--.
Column 5, line 44, delete "axed" and substitute therefore --and--; and
line 52, delete "backed" and substitute therefore --blacked--.
Column 6, line 12, delete "W(r)" and substitute therefore --W($\bar{r}$)--.
Column 7, line 53, delete "time" and substitute therefore --the--.
Column 8, line 27, delete "arid" and substitute therefore --and--; and
line 51, delete "time" and substitute therefore --the--.
Column 9, line 37, delete "time" and substitute therefore --the--;
line 38, delete "time" (first occurrence) and substitute therefore
--the--;
line 45, delete "aim" and substitute therefore --an--;
line 46, delete "time" and substitute therefore --the--;
line 59, delete "time" and substitute therefore --the--;

UNITED STATES PATENT AND TRADEMARK OFFICE
CERTIFICATE OF CORRECTION

PATENT NO. : 5,365,354
DATED : Nov. 15, 1994
INVENTOR(S) : Jannson et al.

It is certified that error appears in the above-indentified patent and that said Letters Patent is hereby corrected as shown below:

line 60, delete "time" and substitute therefore --the--; and
    line 61, delete "time" and substitute therefore --the--.
Column 11, line 30, delete "time" and substitute therefore --the--; and
    line 45, delete "where" and substitute therefore --(where--.
Column 12, line 43, delete "contempt" and substitute therefore --content--.
Column 13, line 1, delete "ns" and substitute therefore --nm--;
    line 5, delete "lead-" and substitute therefore --head---; and
    line 27, delete "C." and substitute therefore --C--.
Column 14, line 30, delete "low" and substitute therefore --now--; and
    line 56, at end of line insert --(Eq. 27)--.
Column 17, line 31, delete "arid" and substitute therefore --and--.
Column 19, line 62, delete "46" and substitute therefore --48--.
Column 20, line 1, delete "-continued"; and
    line 5, delete "46" and substitute therefore --48--.

Signed and Sealed this

Twenty-eighth Day of November 1995

Attest:

BRUCE LEHMAN

*Attesting Officer*      *Commissioner of Patents and Trademarks*